United States Patent
Berkley et al.

(10) Patent No.: US 10,942,527 B2
(45) Date of Patent: Mar. 9, 2021

(54) SYSTEM AND METHOD FOR CONTROLLING ROTORCRAFT LOAD PRIORITY

(71) Applicant: Textron Innovations Inc., Providence, RI (US)

(72) Inventors: Mark Berkley, Hurst, TX (US); David Fuessel, Euless, TX (US); Steven Welch, Mansfield, TX (US); David Meek, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 441 days.

(21) Appl. No.: 15/608,834

(22) Filed: May 30, 2017

(65) Prior Publication Data
US 2018/0348794 A1    Dec. 6, 2018

(51) Int. Cl.
| | | |
|---|---|---|
| G05D 1/08 | (2006.01) | |
| B64D 47/00 | (2006.01) | |
| H02J 3/14 | (2006.01) | |
| B64C 13/50 | (2006.01) | |
| B64C 27/68 | (2006.01) | |
| G06F 1/26 | (2006.01) | |

(52) U.S. Cl.
CPC .......... *G05D 1/085* (2013.01); *B64C 13/503* (2013.01); *B64C 27/68* (2013.01); *B64D 47/00* (2013.01); *G06F 1/266* (2013.01); *H02J 3/14* (2013.01); *B64D 2221/00* (2013.01)

(58) Field of Classification Search
CPC ...... H02J 3/14; H02J 2310/44; H02J 2310/60; B64C 13/503; B64C 2221/00; B64D 2221/00
See application file for complete search history.

(56) References Cited

U.S. PATENT DOCUMENTS

| | | | | |
|---|---|---|---|---|
| 3,842,249 A | * | 10/1974 | Geyer | ................ H02J 13/0062 700/295 |
| 5,422,517 A | | 6/1995 | Verney et al. | |
| 5,754,445 A | * | 5/1998 | Jouper | ..................... H02J 1/14 700/295 |
| 5,844,329 A | | 12/1998 | Bailey et al. | |

(Continued)

FOREIGN PATENT DOCUMENTS

| | | |
|---|---|---|
| EP | 2151905 A3 | 2/2010 |
| EP | 2852020 A1 | 3/2015 |
| ES | 2400152 A2 | 4/2013 |

*Primary Examiner* — Christopher D Hutchens
(74) *Attorney, Agent, or Firm* — Slater Matsil, LLP (57) ABSTRACT

A rotorcraft includes an avionics control unit (ACU) and multiple power distribution units (PDUs) electrically connected to an electrical bus, wherein each PDU of the multiple PDUs is electrically connected to a respective multiple electrical loads, and wherein each PDU of the multiple PDUs is configured to receive commands from the ACU to couple or decouple one or more of its respectively connected multiple electrical loads from the electrical bus. The ACU is configured to send commands to the multiple PDUs to couple or decouple a first set of electrical loads and to couple or decouple a second set of electrical loads from the electrical bus, wherein the coupling or decoupling of the first set and the coupling or decoupling the second set is based on a first priority of the first set and a second priority of the second set, respectively.

20 Claims, 7 Drawing Sheets

(56) References Cited

U.S. PATENT DOCUMENTS

| | | | |
|---|---|---|---|
| 5,936,318 A * | 8/1999 | Weiler | H02J 4/00 307/66 |
| 6,664,656 B2 | 12/2003 | Bernier | |
| 7,482,709 B2 | 1/2009 | Berenger | |
| 7,747,879 B2 | 6/2010 | Tofigh et al. | |
| 7,872,368 B2 | 1/2011 | Karimi et al. | |
| 9,172,272 B2 | 10/2015 | Malo | |
| 9,327,600 B1 | 5/2016 | Nehmeh | |
| 2002/0128759 A1* | 9/2002 | Sodoski | H02J 3/0073 701/36 |
| 2003/0047997 A1* | 3/2003 | Bernier | H02G 3/00 307/9.1 |
| 2007/0296273 A1* | 12/2007 | Reitmann | H02J 3/14 307/34 |
| 2010/0079003 A1* | 4/2010 | Bethel | H02J 9/06 307/66 |
| 2010/0102625 A1* | 4/2010 | Karimi | B60L 8/00 307/9.1 |
| 2010/0282910 A1* | 11/2010 | Stothers | H02J 3/14 244/134 D |
| 2011/0175450 A1 | 7/2011 | Vicari et al. | |
| 2012/0013177 A1* | 1/2012 | Krenz | H02J 4/00 307/9.1 |
| 2013/0158750 A1* | 6/2013 | Bosson | B64C 19/00 701/3 |
| 2015/0045978 A1* | 2/2015 | Yoshiguchi | H02J 3/14 700/295 |
| 2015/0076900 A1 | 3/2015 | Johannsen | |
| 2015/0311832 A1* | 10/2015 | Solodovnik | H02P 5/68 318/51 |
| 2016/0107588 A1* | 4/2016 | White | H02J 3/06 307/9.1 |
| 2016/0122033 A1 | 5/2016 | Liffring et al. | |
| 2017/0063151 A1* | 3/2017 | Freitag | H02J 9/002 |
| 2018/0131192 A1* | 5/2018 | Rozman | B64G 1/425 |
| 2019/0013679 A1* | 1/2019 | Radun | H02J 3/36 |

\* cited by examiner

SYSTEM AND METHOD FOR CONTROLLING ROTORCRAFT LOAD PRIORITY

TECHNICAL FIELD

The present invention relates generally to a system and method for automated electrical power control in a rotorcraft, and, in particular embodiments, to a system and method for grouping electrical loads and controlling the priority of the groups of loads.

BACKGROUND

Generally, a rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

According to an embodiment, a rotorcraft includes an avionics control unit (ACU) and multiple power distribution units (PDUs) electrically connected to an electrical bus, wherein each PDU of the multiple PDUs is electrically connected to a respective multiple electrical loads, and wherein each PDU of the multiple PDUs is configured to receive commands from the ACU to couple or decouple one or more of its respectively connected multiple electrical loads from the electrical bus. The ACU is configured to send commands to the multiple PDUs to couple or decouple a first set of electrical loads and to couple or decouple a second set of electrical loads from the electrical bus, wherein the coupling or decoupling of the first set and the coupling or decoupling the second set is based on a first priority of the first set and a second priority of the second set, respectively.

According to another embodiment, an avionics control unit (ACU) for a rotorcraft includes a processor and a non-transitory computer-readable storage medium storing a program to be executed by the processor, the program including instructions for connecting groups of electrical loads to electrical power. The instructions for disconnecting the groups of electrical loads includes instructions for determining a state of the rotorcraft, updating a prioritization of the groups of electrical loads in response to determining the state of the rotorcraft, and transmitting commands to multiple circuit breakers to connect a first group of electrical loads to electrical power, wherein the first group of electrical loads is based on the updated prioritization.

According to another embodiment, a method includes determining, by an electrical control system of a rotorcraft, priorities assigned to designated groups of electrical loads of the rotorcraft, wherein the electrical loads are physically distributed across the rotorcraft, and wherein a first group of electrical loads includes different electrical loads respectively connected to different power distribution units (PDUs) of multiple PDUs of the rotorcraft. The method also includes monitoring, by the electrical control system, electrical power data from an electrical power sensor, and transmitting, by the electrical control system, signals to the multiple PDUs to decouple the groups of electrical loads from an electrical power source of the rotorcraft until the used electrical power of the rotorcraft is less than a first electrical power threshold, wherein the groups of electrical loads are decoupled in an order based on the priorities assigned to the groups of electrical loads.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

Embodiments of the system presented herein are directed to providing a system and method for an Electrical Power Distribution System (EPDS) with configurable electrical load prioritization. The EPDS described herein may be used in a rotorcraft with or without a FBW system. The EPDS can use Secondary Power Distribution Units (SPDUs) connected to associated loads that are located physically near each other, which may reduce weight due to wiring. The SPDUs contain one or more circuit breakers that are connected to the associated loads. The SPDUs can also allow loads to be grouped into "virtual load groups" based on characteristics other than physical location, and these virtual load groups can be coupled or decoupled to electrical power by the SPDUs based on command signals. The virtual load groups can also be prioritized with respect to being decoupled in the event of a reduction of available electrical power. Setting or changing the priority of the loads can increase safety under conditions such as a generator failure. Different virtual load group prioritizations may be configured for different flight conditions, missions, or states. The prioritizations may be set prior to flight or changed during flight. Flight control computers (FCCs), an avionics control unit (ACU), or other on-aircraft computers may also automatically change the virtual load group prioritization, reducing pilot workload and permit a pilot to concentrate "out the windshield" by reducing the need to monitor the state of the EPDS, loads, or other electrical components.

Figure 1:
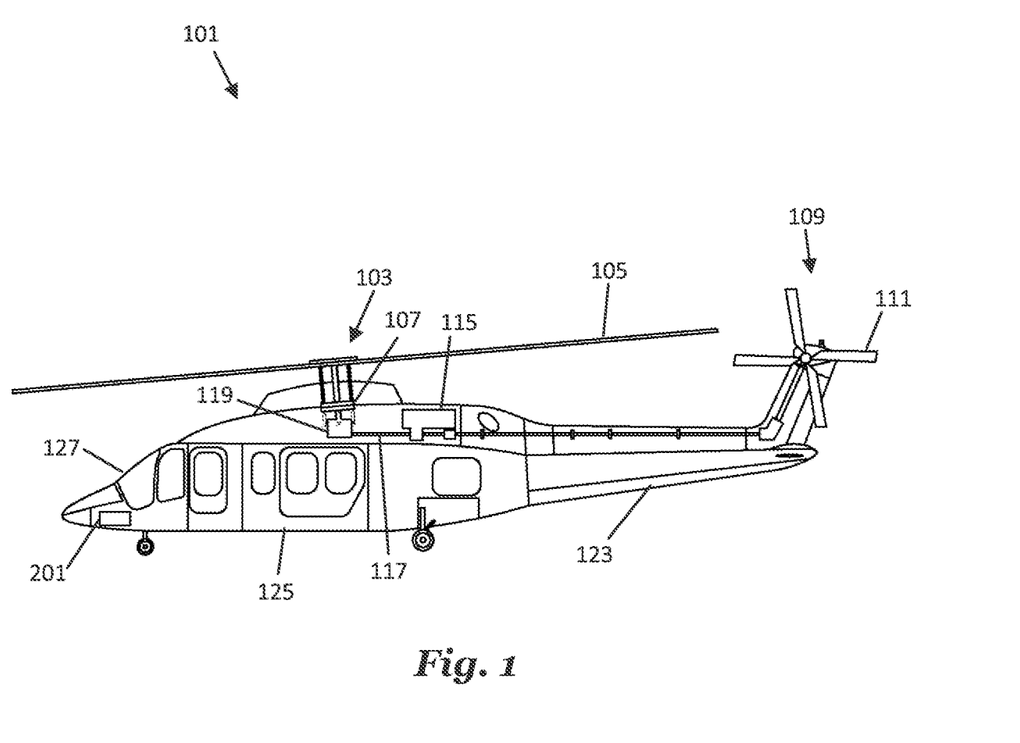
FIG. 1 illustrates a rotorcraft according to some embodiments.

FIG. 1 illustrates a rotorcraft 101 according to some embodiments. The rotorcraft 101 has a main rotor system 103, which includes multiple main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively. The engines 115 may also be coupled to one or more generators that generate electric power for components of the rotorcraft 101.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
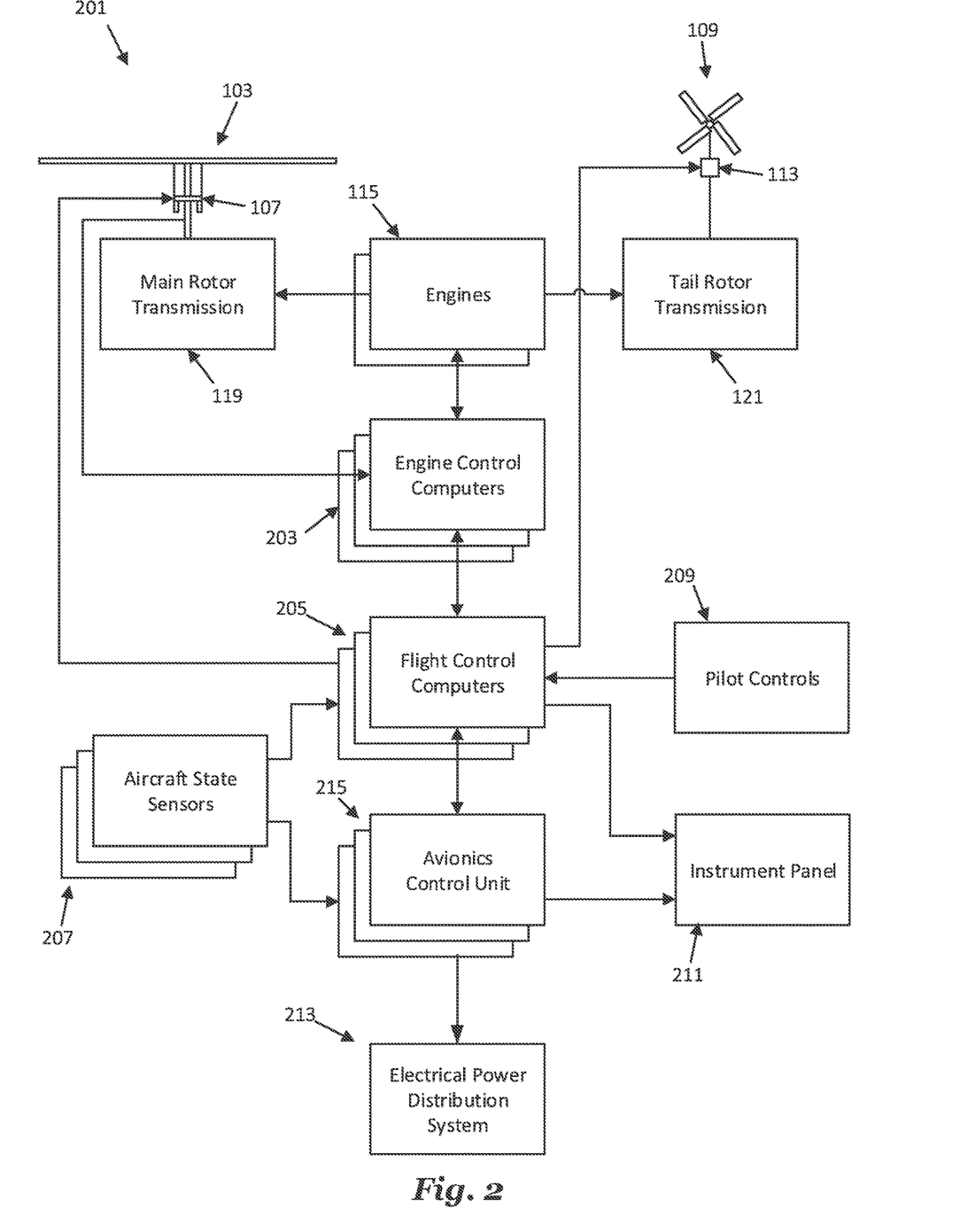
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls 209 in order to control flight of the rotorcraft. The pilot flight controls 209 may include manual controls such as a cyclic stick, a collective stick, and pedals (not illustrated). Inputs provided by the pilot to the pilot flight controls 209 may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers 205, and aircraft sensors 207, which collectively adjust the flight control devices. The flight control system 201 also includes an Avionics Control Unit (ACU) 215, which controls various electronic components of the rotorcraft, and an Electrical Power Distribution System (EPDS) 213, which controls the distribution of electrical power to various components of the rotorcraft.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls 209 through sensors associated with each of the pilot flight controls 209. The input commands are received by measuring the positions of the pilot controls 209. The FCCs 205 also control tactile cueing commands to the pilot controls 209 or display information in instruments on, for example, an instrument panel 211. The FCCs 205 may be connected to the ACU 215, and may transmit commands to the ACU 215 or receive data from the ACU 215.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades. The ECCUs 203 may be connected to the ACU 215, and may transmit commands to the ACU 215 or receive data from the ACU 215.

The aircraft sensors 207 are in communication with the FCCs 205, the ACU 215, or other rotorcraft systems. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 may include sensors relying upon data or signals originating external to the rotorcraft, such as a global positioning system (GPS) sensor, a VHF Omnidirectional Range sensor, Instrument Landing System (ILS), and the like. The aircraft sensors 207 may include sensors for monitoring electrical components of the rotorcraft, such as for monitoring available electrical power, currents provided to electrical loads, a state of the EPDS 213, or for providing other information.

The Avionics Control Unit (ACU) 215 is connected to and may control electronic components of the rotorcraft. For example, the ACU 215 may be connected to, transmit data to, or receive data from the aircraft state sensors 207, the instrument panel 211, the EPDS 213, or various other electronic components of the rotorcraft. The ACU 215 may be a separate module or system, or the ACU 215 may be incorporated within another system. In some cases, the FCCs 205 and/or the ECCs 203 may be integrated within the ACU 215. In some cases, the Instrument Panel 211 may include a display showing information pertaining to the ACU 215 or including controls for the pilot to adjust, change, or operate portions of the ACU 215.

The Electrical Power Distribution System (EPDS) 213 is connected to the ACU 215 and may control the distribution of electrical power between components of the rotorcraft. For example, the EPDS 213 can control the transmission of electrical power from electrical power sources (e.g., generators, auxiliary power units (APUs), batteries, etc.) to electrical loads. The electrical power may be transmitted via one or more electrical buses. In some cases, the EPDS 213 may include circuit breakers, and the pilot or the ACU 215 can couple or decouple a load or a group of loads from an electrical bus at a circuit breaker. In some cases, a load may be decoupled from a bus if the load fails, if the load draws excess current, or if the amount of electrical power available to the EPDS 213 is reduced. A load may be decoupled from a bus for other reasons than those listed herein. In some cases, a load may be automatically decoupled from a bus at a circuit breaker. A load or group of loads may also be re-coupled to the bus if the amount of available electrical power increases. In some cases, a load or group of loads that is decoupled from the bus may be coupled to the bus when the functionality of the load or group of loads is desired. The circuit breakers may be, for example, thermal circuit breakers, electronic circuit breakers (ECBs), solid-state circuit breakers, or another type of circuit breaker. In some cases, the Instrument Panel 211 may include a display showing information pertaining to the EPDS 213 or including controls for the pilot to adjust, change, or operate portions of the EPDS 213. In some cases, the EPDS 213 may be connected to, transmit data to, or receive data from the FCCs 205. The EPDS 213 may be a separate module or system, or the EPDS 213 may be incorporated within another system. For example, the EPDS 213 may be integrated into the ACU 215 or into the FCCs 205. In some cases, the EPDS 213 may be integrated into more than one system. For example, some functions or operations of the EPDS 213 may be integrated into the FCCs 205 and other functions or operations of the EPDS 213 may be integrated into the ACU 215. In some embodiments, the EPDS 213 may be connected to a dedicated controller.

Figure 3:
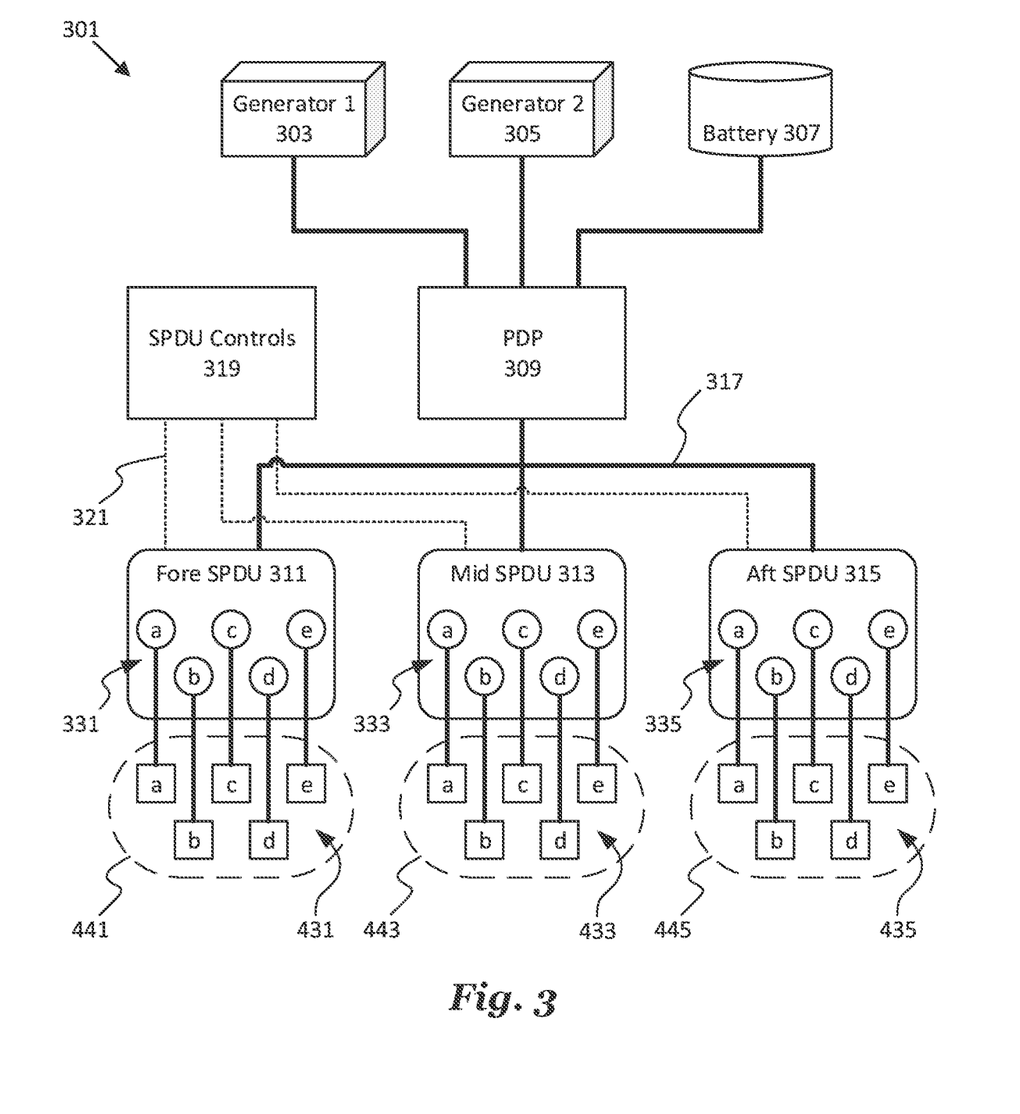
FIG. 3 illustrates an Electrical Power Distribution System (EPDS) according to some embodiments.

FIG. 3 illustrates an example Electrical Power Distribution System (EPDS) 301 according to some embodiments. The example EPDS 301 may be part of a rotorcraft such as rotorcraft 101 shown in FIG. 1, or may be similar to EPDS 213 shown in FIG. 2. The EPDS 301 controls distribution from electrical power sources to electrical loads on the rotorcraft. The electrical power sources of the example EPDS 301 include a first generator 303, a second generator 305, and a battery 307. Other embodiments may include more, fewer, or different electrical power sources. Other embodiments may include an electrical power source external to the rotorcraft. The electrical power sources are electrically coupled to a Power Distribution Panel (PDP) 309 which distributes the electrical power via one or more electrical buses 317. Though one PDP 309 is shown in the EPDS 301, more PDPs may be used in other embodiments, and the electrical power sources may be connected to multiple PDPs in different configurations. The PDP 309 may be connected to the ACU 215 or another system on the rotorcraft, and receive commands from or transmit data to the ACU 215 or another system on the rotorcraft.

The PDP 309 is connected to one or more secondary power distribution units (SPDUs). Example SPDUs 311, 313, and 315 are shown in FIG. 3, though in other cases more or fewer SPDUs may be used. Electrical power is transmitted from the PDP 309 to the SPDUs via one or more electrical buses 317. In other cases, electrical buses 317 may be connected in different configurations than shown in FIG. 3. For example, the SPDUs may be connected to the PDP 309 or to electrical power sources by independent electrical buses 317 or by redundant electrical buses 317, or the SPDUs may be connected to more than one PDP 309. The SPDUs may be connected in parallel or serially, or in a combination.

Each SPDU includes one or more circuit breakers that are each connected to one or more electrical loads. Each SPDU can couple or decouple each of the connected loads from an electrical bus 317 via its circuit breakers. Loads may include rotorcraft components such as a flight control system, actuators, lights, displays, or other rotorcraft components and accessories. As an illustrative example, FIG. 3 shows first SPDU 311 having circuit breakers 331a-e connected to a first physical load group 441 that includes loads 431a-e, second SPDU 313 having circuit breakers 333a-e connected to a second physical load group 443 that includes loads 433a-e, and third SPDU 315 having circuit breakers 331a-e connected to third physical load group 445 that includes loads 435a-e. The SPDUs shown in FIG. 3 have each of its circuit breakers connected to one load apiece, but in other embodiments one or more circuit breakers in each SPDU may be connected to more than one load. SPDUs may also have more or fewer circuit breakers than shown in FIG. 3. For example, an SPDU may have 1, 5, 10, 50, or 100 circuit breakers, or another number of circuit breakers. In some embodiments, an SPDU houses or otherwise contains its circuit breakers, and in other embodiments, some or all of an SPDU's circuit breakers may be external to it or physically separated from it. Each SPDU is connected to SPDU Controls 319 via data buses 321, and can receive commands from or transmit data to the SPDU Controls 319. The SPDU Controls 319 may be, for example, part of or connected to the ACU 215, the Instrument Panel 211, or another system on the rotorcraft. In some cases, each SPDU may control its circuit breakers to couple or decouple one or all of its connected loads based on commands received from the SPDU Controls 319 or from the ACU 215 through the SPDU controls 319. In some cases, an SPDU may control one of its circuit breakers to couple or decouple a connected load automatically based on sensor data or computation performed within the SPDU.

To reduce wiring, an SPDU may be located near its connected loads. For example, an SPDU located near the fore of the rotorcraft may be connected to loads also located near the fore of the rotorcraft. In this manner, the physical load group associated with a SPDU may contain loads that are in relatively close proximity. For example, first SPDU 311 may be located near the fore of the rotorcraft, second SPDU 313 may be located near the center of the rotorcraft, and third SPDU 315 may be located near the aft of the rotorcraft. Similarly, loads 431a-e, loads 433a-e, and loads 435a-e may be located near the fore, center, and aft of the rotorcraft, respectively. This is an illustrative example, and these or other SPDUs may be located in other positions on the rotorcraft, which may depend on the physical distribution of loads on the rotorcraft. In some embodiments, the circuit breakers of an SPDU may be physically distributed such that some or all of the SPDU's circuit breakers are located near their connected loads. In some embodiments in which multiple PDPs are used, the PDPs are located at different places on the rotorcraft, with each PDP connected to SPDUs. In this manner, the use of an EPDS such as EPDS 301 may reduce the total length of wiring needed, which can both simplify the wiring and reduce rotorcraft weight due to wiring.

The use of SPDUs as shown in EPDS 301 allows loads to be coupled or decoupled to electrical power irrespective of their physical location on the rotorcraft or their physical connection to the PDP 309. For example, the SPDU Controls 319 may send a command to an SPDU to decouple a single specific load. The SPDU Controls 319 may also, for example, send commands to one or more SPDUs to decouple a set of loads that are not physically located near each other. In some cases, a set of loads can be decoupled (or re-coupled) based on a shared characteristic. For example, certain loads may be more essential for safe flight than other loads. In the event of a reduction of electrical power (e.g., due to a generator failure or another reason), it may be desirable that some less essential loads or groups of less essential loads be decoupled from the electrical bus to ensure that the more essential loads receive adequate electrical power. In some cases, more and more loads or groups of loads may be decoupled until the electrical power drawn by the remaining coupled loads is less than the amount of available electrical power or some other threshold. In a scenario such as this, the inessential loads may be located throughout the rotorcraft, and the SPDU Controls 319 can send appropriate commands to SPDUs to decouple these inessential loads. In some cases, the SPDU Controls 319 may send the commands based on data from aircraft sensors 207, signals received from ACU 215, or signals received from the Instrument Panel 211. In some cases, these signals are received in response to pilot input.

As described above, EPDS 301 and the use of SPDUs allows electrical loads to be grouped according to criteria other than as "physical load groups" based on physical location or the specific connections of the loads to the bus. For example, loads may be grouped into "virtual load groups" based on safety, mission relevance, flight status, or other criteria. A virtual load group may include a single load or multiple loads which may be physically distributed throughout the rotorcraft. The loads included in a virtual load group may change before or during flight. In each of these cases, some virtual load groups may be considered more essential than others and thus have a higher designated priority, and some virtual load groups may have a lower designated priority. The virtual load groups may have different priorities that represent a hierarchy of priorities ("a virtual load group prioritization"). In a situation for which loads need to be decoupled, the lowest priority virtual load groups may be decoupled first, followed by the virtual load group with the second-lowest priority, followed by the virtual load group with the third-lowest priority, and so forth. In some cases, individual loads may be prioritized, and loads decoupled individually according to their priority. In some cases, a virtual load group may include sub-groups of loads, each sub-group with its own priority.

Figure 4A:
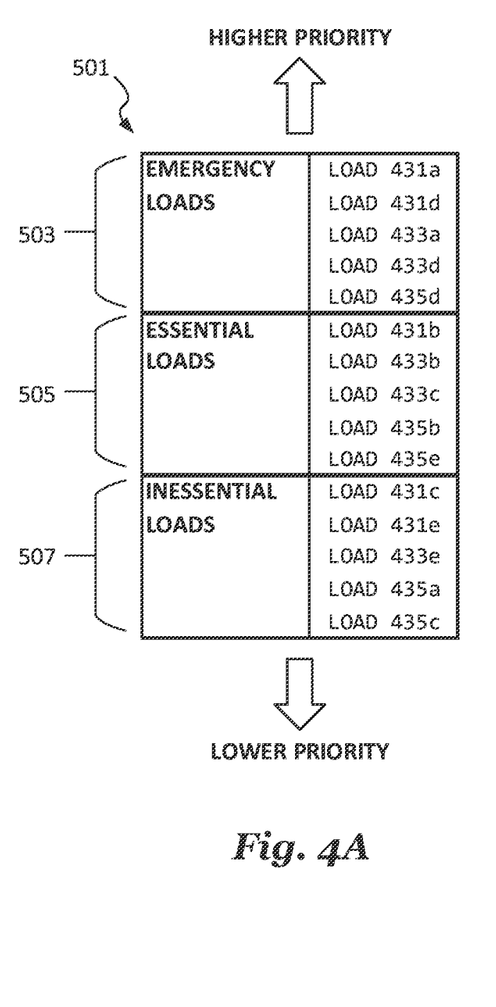
FIGS. 4A-4B illustrate prioritizations of virtual load groups according to some embodiments.
Figure 4B:
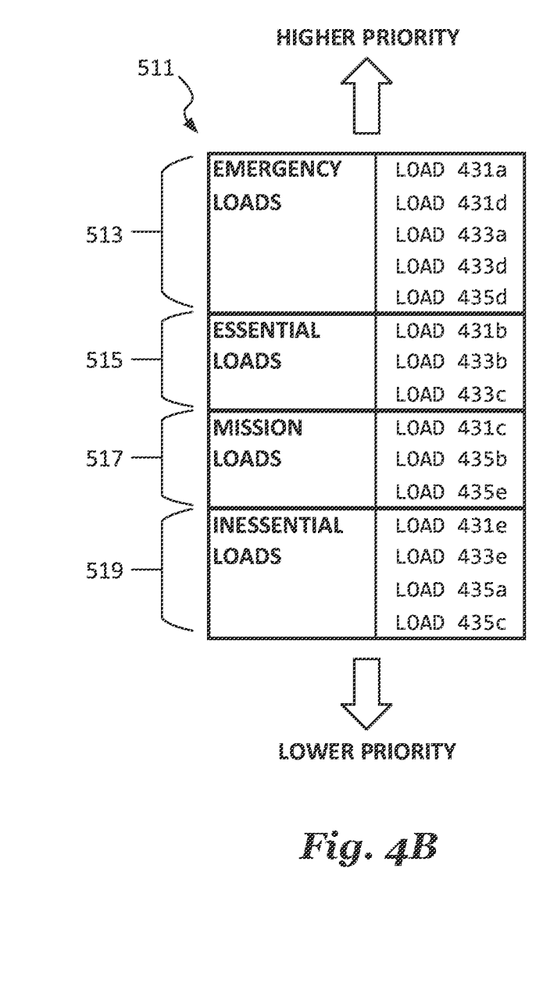

FIG. 4A and FIG. 4B show examples of virtual load group prioritizations according to some embodiments. FIG. 4A shows an example virtual load group prioritization 501 that includes three virtual load groups 503, 505, and 507. Each virtual load group 503, 505, 507 includes several electrical loads, and the electrical loads shown in FIG. 3 are used in FIG. 4A as example loads. Each virtual load group 503, 505, 507 may contain loads from more than one physical load group 441, 443, 445, as shown. In other cases, different numbers of virtual load groups including different numbers of loads may be used. In FIG. 4A, virtual load group 503 has the highest priority and virtual load group 507 has the lowest priority. For example, as shown in FIG. 4A, virtual load group 503 with the highest priority may correspond to "Emergency Loads," which may include loads necessary to operate the rotorcraft safely. For example, virtual load group 503 may include emergency loads such as flight control, fuel pump, navigation, or communication loads. Virtual load group 505 may correspond to "Essential Loads," which may include loads that increase flight safety but are not necessary, such as redundant aircraft systems. Virtual load group 507 may correspond to "Non-essential Loads," which may include loads that are optional or aesthetic, such as the cabin A/C or superfluous lighting. Thus, in a situation in which it is necessary to decouple loads from the bus, all of the loads in virtual load group 507 can together be decoupled first. If more loads need to be decoupled, all of the loads in virtual load group 509 are then decoupled together. Within each virtual load group, the loads may together be decoupled roughly simultaneously. In some cases, the loads within a virtual load group may be decoupled roughly simultaneously but in a particular order or sequence. These are examples, in other cases, virtual load groups may correspond to loads having different characteristics or priorities than those described herein.

Other virtual load group prioritizations may be defined for a given set of loads, and different virtual load group prioritizations may be used for specific scenarios. FIG. 4B shows another example virtual load group prioritization 511 that includes four virtual load groups 513, 515, 517, and 519. Each virtual load group 513, 515, 517, and 519 includes several electrical loads, and the electrical loads shown in FIG. 3 are used in FIG. 4B as example loads. The individual electrical loads in FIG. 4B may or may not represent the same loads as those shown in FIG. 4A. Each virtual load group 513, 515, 517, and 519 may contain loads from more than one physical load group 441, 443, 445, as shown. In FIG. 4B, virtual load group 503 has the highest priority and virtual load group 519 has the lowest priority. In example prioritization 511, virtual load group 513 corresponds to "Emergency Loads," virtual load group 515 corresponds to "Essential Loads," and virtual load group 519 corresponds to "Non-essential Loads." These designations may be similar to the virtual load groups of FIG. 4A, but may have other specific characteristics in other cases. As an illustrative example, prioritization 511 also includes virtual load group 517, corresponding to "Mission Loads." Virtual load group 517 may, for example, include loads associated with use during a specific mission or action. For example, for a rotorcraft rescue mission, a hoist, a searchlight, or an imaging system may be electrical loads included in virtual load group 517 ("Mission Loads"). In the example prioritization 511, virtual load group 517 ("Mission Loads") has a higher priority than virtual load group 519 ("Inessential Loads"). In this manner, the non-essential loads are decoupled before loads that may be needed for a successful mission. By decoupling virtual load groups with a lower priority, a mission may continue despite a reduction of electrical power during flight. In some cases, there may be multiple virtual load groups with different priorities corresponding to "Mission Loads." In some cases, more than one type of mission may correspond to the same virtual load group, or different types of missions may correspond to different virtual load groups. A virtual load group corresponding to "Mission Loads" may have a different priority in other cases or in other situations. In some cases, a prioritization may include more than one virtual load group characterized by a mission, and in some cases specific electrical loads may belong to more than one virtual load group.

In some embodiments, the pilot or the ACU 215 may select a virtual load prioritization before or during a flight. In some cases the pilot may select a prioritization from a list of prioritizations, for example using the Instrument Panel 211. The prioritization selected may depend on expected flight conditions, mission characteristics, or other factors. For example, if the rotorcraft is to be used for a mission, prior to takeoff the pilot may select a "Mission Prioritization" (e.g., prioritization 511) that is configured for that mission. A specific prioritization may be selected prior to flight for different situations such as expected weather conditions, flying at night, one or more missions (including multiple missions of different types), additional on-board weight, or other situations or combinations of situations.

The pilot or ACU 215 may also change the prioritization during flight. For example, the rotorcraft may use a first prioritization until the rotorcraft is closer to some mission location or until an event occurs, and then the pilot may switch to a "Mission Prioritization." In some cases, a first prioritization may be used until the rotorcraft reaches a waypoint or is within a certain distance from a waypoint, at which point the prioritization is changed to a second prioritization. Similarly, the prioritization may be changed from a "Mission Prioritization" to another prioritization after a completed or attempted mission when the rotorcraft is a certain distance away from a location. In some cases, the ACU 215 may automatically change the prioritization based on a location, event, or action. By changing the prioritization, the loads may be regrouped into different virtual load groups more appropriate for a situation. In some cases, changing the prioritization may change the number of designated virtual load groups, such as changing from prioritization 501 to prioritization 511 or vice versa. As another illustrative example, after a mission is completed the prioritization may be changed from a "Mission Prioritization" to a "Mission Completed Prioritization." As another example, if a mission is aborted during flight, the prioritization may be changed to a non-mission prioritization. Different missions may have different prioritizations. For example, a "People Transport Mission" may have a different prioritization than a "Search and Rescue Mission." The prioritization may be changed to a different prioritization before, during, or after flight if the mission is changed. As another example of a prioritization use, a "Powerup Prioritization" may be selected for the powering up of the rotorcraft. In some cases, a "Powerup Prioritization" may allow loads to be coupled according to the "Powerup Prioritization" as power sources are connected or activated. Similarly, a "Shutdown Prioritization" may be selected for rotorcraft shutdown, and in some cases may loads may be decoupled according to the "Shutdown Prioritization" as power sources are disconnected or deactivated. As another example, a "Takeoff Prioritization" may be selected during takeoff before changing to a different prioritization after takeoff is completed. Similarly, a "Landing Prioritization" may be selected by the pilot or the ACU 215 before or during a landing operation. Additionally, virtual load groups and their prioritizations may be different for different models of rotorcraft or may depend on the specific features/accessories present on a rotorcraft.

In some cases, the ACU 215 may automatically change the prioritization based on flight status or data from aircraft sensors 207. For example, the ACU 215 may change from a "Low Altitude Prioritization" to a "High Altitude Prioritization" based on data from an altitude sensor, or may change from a "Day Prioritization" to a "Night Prioritization" based on the time of day or ambient light conditions, or may change prioritizations due to speed, pitch, input from pilot controls 209, other states, or combinations of states. For example, a "Night Prioritization" may have the rotorcraft's external lighting in a higher priority virtual load group than a "Day Prioritization." As another example, the ACU 215 may automatically change to an "Emergency Prioritization" if more than one power source fails. In some cases, the ACU 215 may select a current prioritization from a list of possible prioritizations (e.g., from a lookup table or the like) or may generate a prioritization based on a state or an expected state of the rotorcraft. The ACU 215 may generate a prioritization using an algorithm, for example.

Figure 5A:
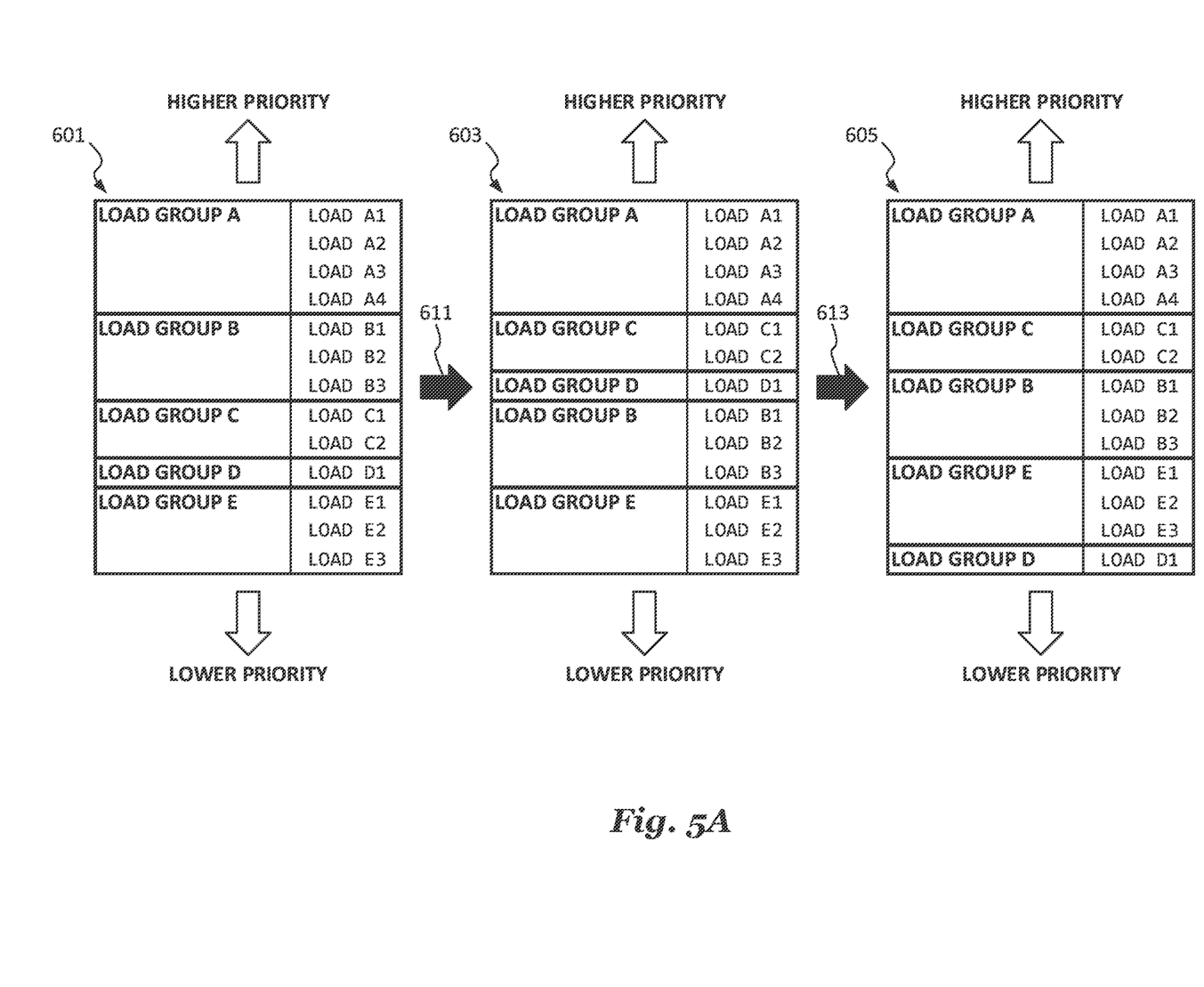
FIGS. 5A-5B illustrate changes to prioritizations of virtual load groups according to some embodiments.
Figure 5B:
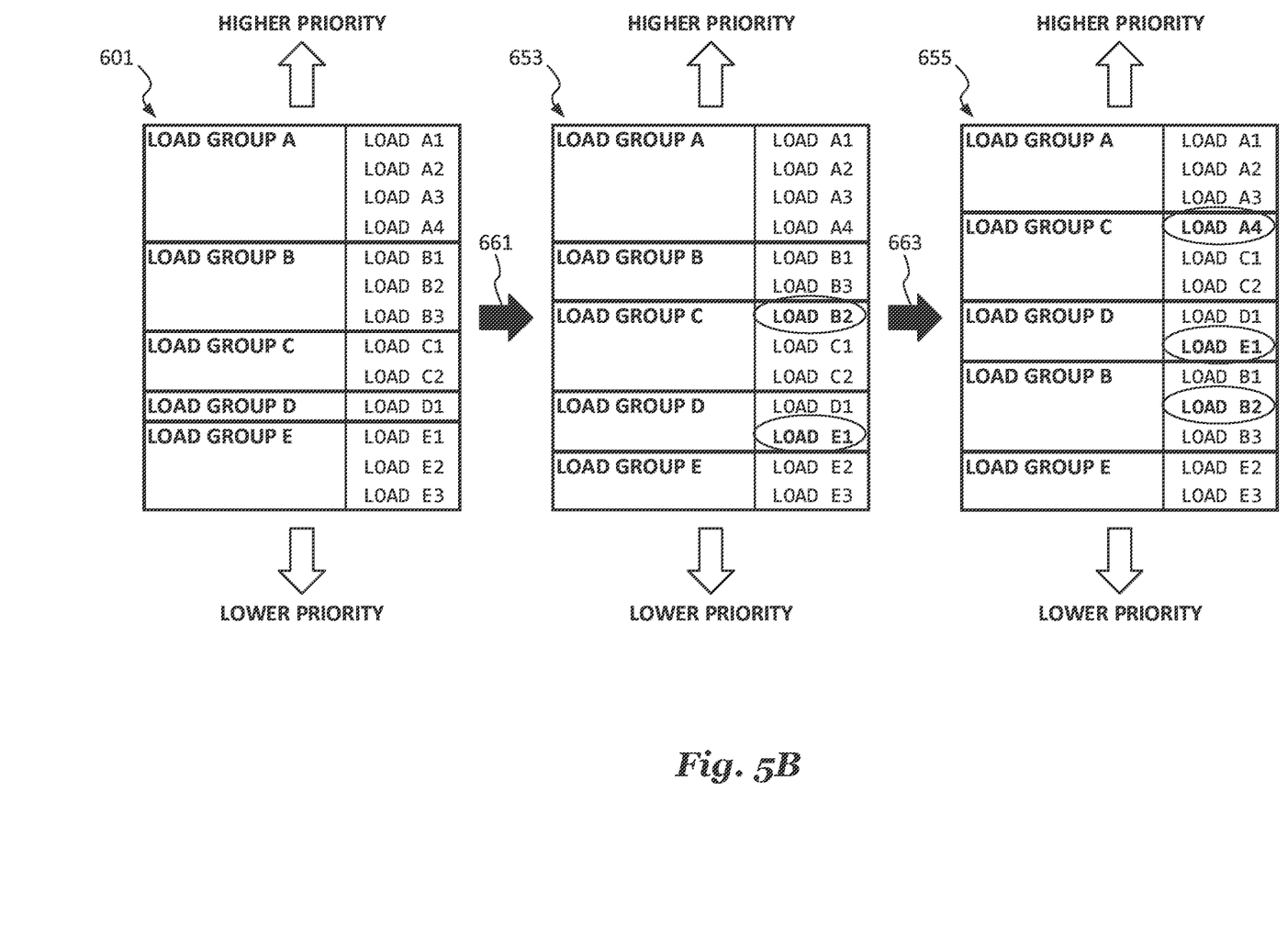

FIGS. 5A-5B show changes between example virtual load group prioritizations according to some embodiments. The prioritizations shown in FIGS. 5A-5B describe examples of how the virtual load groups within a prioritization may be changed in response to pilot input, sensor data, ACU 215 commands, etc. Example first prioritization 601 includes five virtual load groups labeled A, B, C, D, and E. Each virtual load group in first prioritization 601 includes at least one electrical load. Referring to FIG. 5A, at 611 the prioritization is changed from first prioritization 601 to second prioritization 603. Second prioritization 603 differs from first prioritization 601 by the relative priorities of virtual load groups B, C, and D. Note that virtual load groups A and E retain their relative priorities from first prioritization 601 to second prioritization 603. Also note that all virtual load groups A, B, C, D, and E retain their original included loads from first prioritization 601 to second prioritization 603. At 613, the prioritization is changed from second prioritization 603 to third prioritization 605. Third prioritization 605 differs from second prioritization 603 by the relative priorities of virtual load groups B, D, and E. Note that virtual load groups A and C retain their relative priorities from second prioritization 603 to third prioritization 605. In some cases, the first prioritization 601, second prioritization 603, or the third prioritization 605 may have designated configurations (e.g., "Takeoff," "Mission Type #1," "Daytime Flight," etc.). In some cases, the first prioritization 601 may be changed to the second prioritization 603, or the second prioritization 603 may be changed to the third prioritization 605 by the pilot or ACU 215 based on a state or expected state of the rotorcraft.

Referring to FIG. 5B, at 661, the prioritization is changed from first prioritization 601 to fourth prioritization 653. Fourth prioritization 65 differs from first prioritization 601 by the specific loads included within virtual load groups B, C, D, and E. Note that load B2 has been moved from virtual load group B to virtual load group C, and that load E1 has been moved from virtual load group E to virtual load group D. Also note that the numbers of loads within each of groups B, C, D, and E has changed. The relative priorities of virtual load groups A, B, C, D, and E have not changed between first prioritization 601 and fourth prioritization 651. At 663, the prioritization is changed from fourth prioritization 653 to fifth prioritization 655. Fifth prioritization 655 differs from fourth prioritization 603 by both the relative priorities of virtual load groups B, C, and D and by the specific loads included within virtual load groups A, B, and C. Note that load B2 has been moved from virtual load group C back to virtual load group B, and that load A4 has been moved from virtual load group A to virtual load group C. Also note that load E1 remains in virtual load group D and that virtual load groups A and E retain their relative priorities from fourth prioritization 653 to fifth prioritization 655. In some cases, the first prioritization 601, fourth prioritization 653, or the fifth prioritization 655 may have designated configurations, or may be changed by the pilot or ACU 215 based on a state or expected state of the rotorcraft. In this manner, electrical loads may be efficiently and dynamically prioritized within virtual load groups for different scenarios.

Figure 6:
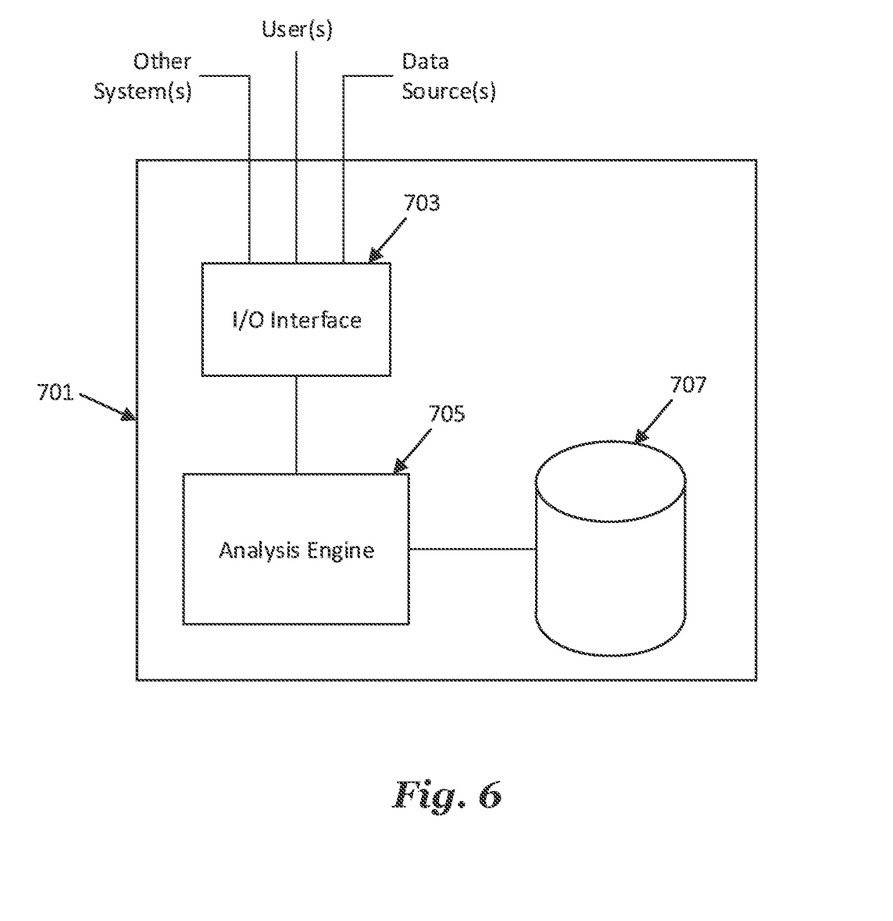
FIG. 6 illustrates a computer system according to some embodiments.

FIG. 6 illustrates a computer system 701 according to some embodiments. The computer system 701 can be configured for performing one or more functions with regard to the operation of the flight control system 201, the ACU 215, the FCCs 205, or the EPDS 301, as described herein. Further, any processing and analysis can be partly or fully performed by the computer system 701. The computer system 701 can be partly or fully integrated with other rotorcraft computer systems. In some embodiments, the computer system 701 is an FCC, and performs processing in parallel with other, redundant FCCs.

The computer system 701 can include an input/output (I/O) interface 703, an analysis engine 705, and a database 707. Alternative embodiments can combine or distribute the I/O interface 703, the analysis engine 705, and the database 707, as desired. Embodiments of the computer system 701 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multipurpose machines, for example computer workstations, that are suitable for also performing other tasks.

The I/O interface 703 can provide a communication link between external users, systems, and data sources and components of the computer system 701. The I/O interface 703 can be configured for allowing one or more users to input information to the computer system 501 via any known input device. Examples can include a keyboard, mouse, touch screen, and/or any other desired input device. The I/O interface 703 can be configured for allowing one or more users to receive information output from the computer system 701 via any known output device. Examples can include a display monitor, a printer, cockpit display, instrument panel, and/or any other desired output device. The I/O interface 703 can be configured for allowing other systems to communicate with the computer system 701. For example, the I/O interface 703 can allow one or more remote computer(s) to access information, input information, and/or remotely instruct the computer system 701 to perform one or more of the tasks described herein. The I/O interface 703 can be configured to interact with one or more rotorcraft sensors such as those described herein. The I/O interface 703 can be configured for allowing communication with one or more remote data sources. For example, the I/O interface 703 can allow one or more remote data source(s) to access information, input information, and/or remotely instruct the computer system 701 to perform one or more of the tasks described herein.

The database 707 provides persistent data storage for the computer system 501. Although the term "database" is primarily used, a memory or other suitable data storage arrangement may provide the functionality of the database 707. In alternative embodiments, the database 707 can be integral to or separate from the computer system 701 and can operate on one or more computers. The database 707 is a non-transitory computer-readable storage medium and preferably provides non-volatile data storage for any information suitable to support the operation of the ACU 215, the FCCs 205, or the EPDS 301, including various types of data discussed further herein. For example, the database 707 may store information corresponding to one or more virtual load group prioritizations. The analysis engine 705 can include various combinations of one or more processors, memories, and software components.

While this invention has been described with reference to illustrative embodiments and examples, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
an avionics control unit (ACU); and
a plurality of power distribution units (PDUs) electrically connected to an electrical bus, wherein each PDU of the plurality of PDUs is electrically connected to a respective plurality of electrical loads, wherein each electrical load of each plurality of electrical loads is electrically connected to a single PDU of the plurality of PDUs, wherein each PDU of the plurality of PDUs is configured to receive commands from the ACU to couple or decouple one or more of that PDU's respectively connected plurality of electrical loads from the electrical bus;
wherein the ACU is configured to send commands to the plurality of PDUs to couple or decouple a first set of electrical loads and to couple or decouple a second set of electrical loads from the electrical bus, wherein the coupling or decoupling of the first set and the coupling or decoupling the second set is based on a first priority of the first set and a second priority of the second set, respectively.

2. The rotorcraft of claim 1, wherein each PDU of the plurality of PDUs comprises at least one circuit breaker electrically connected to an electrical load of the plurality of electrical loads connected to that PDU.

3. The rotorcraft of claim 1, wherein the plurality of PDUs comprises a PDU connected to a single electrical load.

4. The rotorcraft of claim 1, wherein the ACU is configured to send commands to the plurality of PDUs in response to a pilot input.

5. The rotorcraft of claim 1, wherein the ACU is configured to send commands to the plurality of PDUs in response to receiving data from a rotorcraft sensor.

6. The rotorcraft of claim 5, wherein receiving data from a rotorcraft sensor comprises receiving an indication of a generator failure.

7. The rotorcraft of claim 1, wherein the first priority of the first set of electrical loads is less than the second priority of the second set of electrical loads.

8. The rotorcraft of claim 1, wherein the ACU is configured to change the first priority of the first set of electrical loads relative to the second priority of the second set of electrical loads.

9. The rotorcraft of claim 1, wherein the plurality of PDUs are connected to an electrical power source though a Power Distribution Panel (PDP).

10. An avionics control unit (ACU) for a rotorcraft, comprising:
a processor; and
a non-transitory computer-readable storage medium storing a program to be executed by the processor, the program including instructions for connecting groups of electrical loads to an electrical power bus, the instructions for connecting the groups of electrical loads including instructions for:
identifying a first prioritization of the groups of electrical loads, in which each group of electrical loads is associated with a unique priority;
determining a state of the rotorcraft;
updating a prioritization of the groups of electrical loads in response to determining the state of the rotorcraft to generate an updated prioritization of the groups of electrical loads, wherein at least one group of electrical loads is associated with a different priority in the updated prioritization than in the first prioritization;
determining a first group of electrical loads based on the updated prioritization; and
transmitting commands to a plurality of power distribution units (PDUs) to connect the electrical loads of the first group of electrical loads to the electrical power bus, wherein each PDU of the plurality of PDUs connects a separate subgroup of different electrical loads of the first group of electrical loads to the electrical power bus.

11. The ACU of claim 10, the program further including instructions for transmitting commands to the plurality of PDUs to disconnect groups of electrical loads from the electrical power bus.

12. The ACU of claim 10, wherein updating the prioritization of the groups of electrical loads comprises selecting a prioritization from a set of predetermined prioritizations.

13. The ACU of claim 10, wherein updating the prioritization of the groups of electrical loads comprises generating a new prioritization based on the state of the rotorcraft.

14. The ACU of claim 10, wherein updating the prioritization of the groups of electrical loads comprises changing the distribution of electrical loads included within the one or more groups of electrical loads.

15. The ACU of claim 10, wherein the rotorcraft comprises one or more electrical power supplies that provide electrical power to the electrical power bus, and wherein the state of the rotorcraft comprises the state of the one or more electrical power supplies of the rotorcraft.

16. The ACU of claim 10, wherein the first group of electrical loads has the lowest priority within the updated prioritization.

17. A rotorcraft, comprising:
an electrical control system;
a plurality of electrical loads physically distributed across the rotorcraft; and
a plurality of power distribution units (PDU) connected to the electrical control system, wherein the plurality of PDUs are physically distributed across the rotorcraft aircraft, wherein each PDU of the plurality of PDUs comprises one or more circuit breakers, wherein each circuit breaker is connected to one corresponding electrical load of the plurality of electrical loads, wherein each electrical load is associated with an electrical load group of a plurality of electrical load groups, wherein a first electrical load group of the plurality of electrical load groups comprises different electrical loads respectively connected to different PDUs of the plurality of PDUs, and wherein each electrical load group of the plurality of electrical load groups is associated with a different coupling priority;

wherein the electrical control system is configured to transmit signals to the plurality of PDUs to decouple electrical load groups of the plurality of electrical load groups from an electrical power source of the rotorcraft until the used electrical power of the rotorcraft is less than a first electrical power threshold, wherein the electrical load groups are decoupled in an order based on the coupling priority of each electrical load group of the plurality of electrical load groups.

18. The rotorcraft of claim 17, wherein the electrical control system is further configured to transmit signals to the plurality of PDUs to couple electrical load groups of the plurality of electrical load groups to the electrical power source of the rotorcraft until the used electrical power of the rotorcraft is greater than a second electrical power threshold, wherein the electrical load groups are coupled in an order based on the coupling priority of each electrical load group of the plurality of electrical load groups.

19. The rotorcraft of claim 17, further comprising an electrical power sensor connected to the electrical control system, wherein the coupling priority of each electrical load group of the plurality of electrical load groups is based on an indication of electrical power generated by the electrical power sensor.

20. The rotorcraft of claim 17, wherein the coupling priority of each electrical load group of the plurality of electrical load groups is based on one of a plurality of predetermined priority configurations.

* * * * *

UNITED STATES PATENT AND TRADEMARK OFFICE
CERTIFICATE OF CORRECTION

PATENT NO. : 10,942,527 B2
APPLICATION NO. : 15/608834
DATED : March 9, 2021
INVENTOR(S) : Mark Berkley et al.

Page 1 of 1

It is certified that error appears in the above-identified patent and that said Letters Patent is hereby corrected as shown below:

In the Claims

In Column 15, Line 2, Claim 17, delete "aircraft".

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*